Patented July 11, 1939

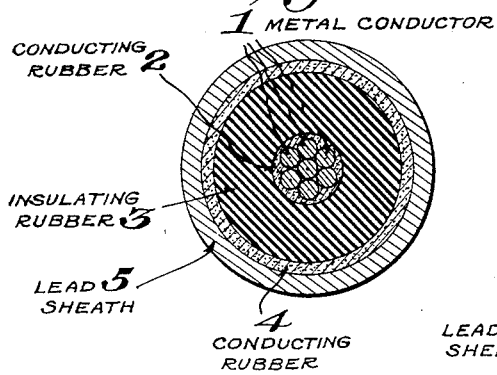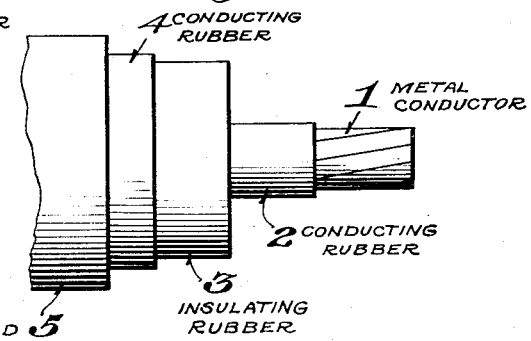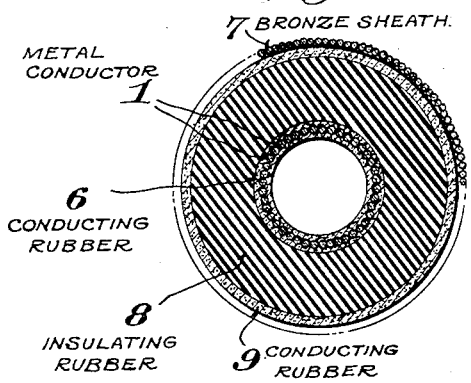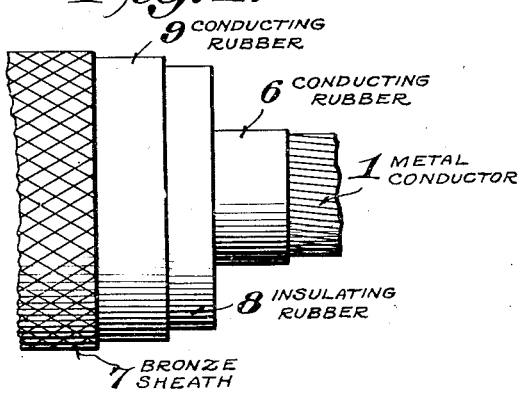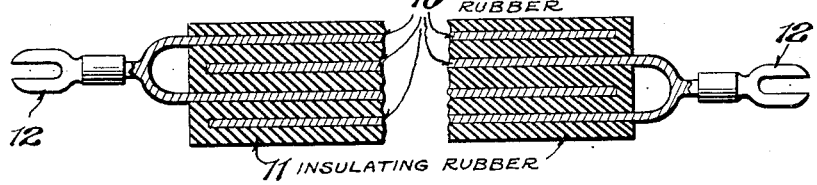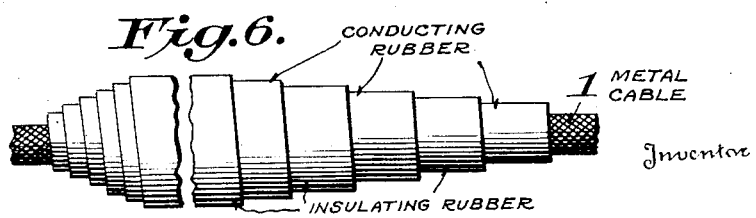

2,165,738

UNITED STATES PATENT OFFICE 2,165,738

ELECTRIC CONDUCTING ELEMENT

Hendrik Adriaan Marius van Hoffen, Johannesburg, Transvaal, Union of South Africa, assignor to Naamlooze Vennootschap: Hollandsche Draad-en Kabelfabriek, Amsterdam, Netherlands, a corporation of the Netherlands Application March 12, 1937, Serial No. 130,587
In the Netherlands September 16, 1931

2 Claims. (Cl. 201—76)

This invention relates to electric conducting elements; and it comprises an electric conducting element, such as a high voltage insulated cable, for example, comprising a layer of conducting rubber derived from an applied solution of rubber containing in suspension a finely divided conducting material, such as graphite or a metallic powder, said layer having been indurated in situ and being usually in combination with one or more layers of insulating rubber, the assembly of rubber layers having been combined by vulcanization, all as more fully hereinafter set forth and as claimed.

This application is a continuation-in-part of my copending application, Serial No. 612,617, filed May 20, 1932, now Patent No. 2,081,517. My prior patent is drawn to a process of manufacturing insulated electric conductors and the like which are provided with at least one layer of conducting rubber, derived from an applied solution of rubber containing in suspension a finely divided conducting solid, while the present application is directed to various electric elements which can be made by the process of my acknowledged prior application.

It has long been known that rubber possesses many properties which make it particularly suitable for use as an insulator for high voltage applications. There are various reasons why rubber has not been more widely adopted for this purpose. For example no entirely suitable process has been known for applying a plurality of rubber layers of differing properties to a conductor without the seemingly inevitable production of air pockets. It has also been heretofore impossible to produce rubber insulation having integrally united intermediate layers of conducting material, which layers are useful in high tension cables, for example, to produce satisfactory voltage distribution. These factors have seriously limited the use of rubber in the high voltage field. Of course the presence of air pockets in high tension cables is highly detrimental since this leads to the so-called corona discharge, to ionization, the formation of ozone, etc., resulting in the rapid deterioration of the rubber.

It has been proposed at various times to employ layers of conducting rubber in cables, these layers being produced by milling unvulcanized rubber with conducting substances, such as carbon, and then applying this mixture by methods usual in the art. Rubber mixtures produced in this manner are thick and tacky and, while they can be applied to a metal conductor by usual methods, such as extrusion, it has been found almost impossible to apply uniform layers of this material to unvulcanized rubber layers. For this reason the use of conducting rubber produced by milling has been very limited.

I have now found that the disadvantages mentioned can be obviated and that extremely thin layers of conducting rubber, uniform in thickness and accurately reproducible, can be applied to metal as well as to unvulcanized insulating rubber by the use of rubber solutions containing a finely divided conducting material in suspension. A suspension of this type can be applied either by dipping or spreading operations. The coating can then be dried or indurated in situ, followed by vulcanization if desired. If one or more layers of insulating rubber are to be applied in addition to the conducting layer or layers, it is desirable to apply all layers in the unvulcanized state and then to vulcanize the assembly as a whole. This integrally unites the insulating and conducting rubber layers with a bond which is usually as strong or stronger than the material of the individual layers and also produces a bond between the rubber and the metal parts of the conductor.

In making the rubber suspensions which are employed in making the articles of the present invention, rubber is dissolved in any of the usual organic solvents, such as benzol, naphtha, vegetable oils or the like. Usually sufficient rubber is added to produce a rather thick solution and, if desired, the viscosity of this solution can be reduced by methods known in the art. The conducting material, which must be in an extremely finely divided state, is then dispersed in this rubber solution. Finely divided graphite, lamp black, or other forms of carbon may be used. It is also possible to employ finely divided metals, such as aluminum powder, as conducting materials. The suspensions formed in this manner are relatively stable but should be agitated before and during use. Various additions may be made to the rubber suspensions. Thus, it is possible to add sulfur or other vulcanizing materials and accelerating agents, anti-oxidants, fillers, etc.

The ratio of the conducting material to the rubber may be varied in order to produce the desired resistance in the final coating. Proportions of carbon as high as 70 parts to 30 parts of rubber may be used. Such proportions produce a conducting rubber having a resistivity (specific resistance) as low as 1 ohm per cubic centimeter. Since the resistivity of many of the alloys employed in resistance units is of the order of $10^{-4}$ while the resistivity of insulating rubber is about $10^{16}$ ohms per centimeter cube, it is evident that the conducting rubber layers used in the present invention may be classed among the electrical conductors.

The articles to be coated may be simply dipped into the rubber suspensions, prepared as described, or the suspensions may be applied by spraying, by brushing or by other usual methods. The resulting coatings may then be dried, followed by vulcanization if desired. The coatings obtained in this manner can be made of uniform thickness and entirely free from air pockets. The thickness of the coating may be predetermined with considerable accuracy. My coatings usually range in thickness from about 0.1 to 0.5 mm. but they can be made even thinner than 0.1 mm. if desired. And, of course, it is possible to build up any desired thickness of coating by applying a plurality of coats.

The drying or indurating of the coatings can be assisted if desired by heating or by any method which tends to increase the rate of evaporation of the rubber solvent. The use of reduced pressure is not generally applicable, however, since this tends to produce gas bubbles in the coatings.

The conducting rubber layers, produced in accordance with the present invention, form a better bond with metal than rubber layers applied by other methods. And my layers can be applied with complete absence of air pockets and with much greater uniformity in thickness and other properties. When layers of insulating rubber are used in conjunction with the conducting rubber layers of the present invention, as in a high voltage cable, for example, a large number of advantages are obtained. These advantages may be summarized as follows:

First, the rubber layers produced in accordance with the present invention are homogeneous and resilient, hence shrinkage and stretching on account of changes in temperature occur without damage to the insulation. The formation of interstices is avoided which prevents ionization and dielectric losses.

Second, insulating rubber layers can be employed having disruptive strengths of as high as 30 to 40 kilovolts per millimeter. It is therefore evident that extremely thin layers of insulation can be employed since the maximum permissible voltage is much higher than that for layers of impregnated paper, for example. This results in a saving, not only of rubber, but also of the material of the external metal sheath since the diameters of the cables within the present invention can be reduced.

Third, electric elements made in accordance with the present invention can be adapted to widespread uses owing to the fact that the dielectric constants of the various rubber layers can be varied from 3 to 6 merely by a choice of fillers. It is therefore possible to make cables or terminal bushings having an insulation whose dielectric constant decreases progressively outwardly. With paper insulation the production of this type of insulation is more difficult. It is also possible to produce conducting layers having differing conductivities.

Fourth, it is possible to produce flexible high-voltage cables.

Fifth, it is possible to provide a predetermined distribution of voltage in the insulation which is accomplished by the introduction of intermediate layers of conducting rubber. These layers may be provided with braided wire conductors imbedded therein in order to increase their conductivity.

Sixth, it is possible to produce many special types of electric elements having rubber conducting surfaces or layers. One example of such a novel element is a high voltage condenser formed from a plurality of layers of conducting rubber alternating with layers of insulating rubber. An assembly of this nature can be vulcanized as a whole, which produces a permanent bond between the insulating and conducting layers, then the resulting condenser can be rolled up, if desired, in order to make it more compact.

Another special class of electric elements within the present invention includes the so-called lead-in insulators or terminal bushings for high voltage transformers and the like. These can be constructed with alternating layers of conducting and insulating rubber. The capacities of the condensers thus produced can be predetermined. The first layer of conducting rubber is usually applied to the metal conductor since the conducting rubber makes an excellent bond with the metal as well as an excellent base upon which to apply a subsequent coating of insulating rubber. When thus constructed the resulting terminals are entirely free from air pockets which are particularly detrimental in this type of electric element.

Conducting rubber can also be advantageously employed in the insulation of cable joints and cable sealing boxes. For this purpose the rubber employed may be prevulcanized, if desired.

My invention can be explained in greater detail by reference to the accompanying drawing which shows, more or less diagrammatically, several embodiments of electric elements within the present invention. In this showing, Fig. 1 is a cross section of a high-voltage cable with a stranded core, Fig. 2 is an elevation of the same cable with the various layers of rubber broken away to show the structure, Fig. 3 is a cross section of a flexible, high-voltage cable with a hollow core of braided wire covered with conducting and insulating rubber layers, Fig. 4 is an elevation of the flexible cable with the various layers of rubber broken away, Fig. 5 is a longitudinal section through a condenser within the present invention, while Fig. 6 is a high voltage transformer terminal, provided with conducting rubber condensers, without its casing.

Referring first to Figs. 1 and 2, the metal core is shown at 1. This is covered with a thin layer 2 of conducting rubber. A thicker layer 3 of insulating rubber is then provided, this being covered with a second layer 4 of conducting rubber. These rubber layers are enclosed within a lead sheath 5 which may be applied before or after vulcanization. This lead sheath is usually grounded, serving as a conductor for currents induced therein. When this sheath is applied before vulcanization, very intimate contact is obtained between the sheath and the rubber beneath. The conducting rubber layer 2 which covers the metal core 1 may be applied by extrusion methods, if desired, but it has been found essential for the production of satisfactory results that outer coatings of conducting rubber should be formed by the application of a rubber suspension, as described previously.

In the structure shown in Figs. 3 and 4 a hollow core is used, this core being formed by a braided hollow conductor 1 coated with a layer 6 of conducting rubber. Insulating layer 8 and conducting layer 9 are applied over the core and the whole is encased in a flexible braided metal sheath of bronze or other metal wire.

In the condenser shown in Fig. 5, the layers 10 of conducting rubber alternate with layers 11 of insulating rubber, the outside of the condenser being covered with insulating rubber. It is noted that alternate layers of conducting rubber extend from opposite ends of the condenser, these being joined, usually by vulcanization, and then being provided with terminals 12 at either end.

In Fig. 6, which represents a high voltage transformer terminal, the metal core 1 is covered with alternating layers of conducting and insulating rubber as shown. The casing is applied over the terminal, the space between the terminal and the casing being usually filled with oil or insulating compound to prevent corona. The assembly of rubber layers shown in Fig. 6 provides for equal distribution of dielectric stress throughout the insulation. This is accomplished by having the successive lengths of the insulating and conducting layers differ by equal amounts. With various arrangements of conducting rubber layers and rubber layers having varying dielectric constants the distribution of voltage within such an element can be accurately predetermined.

While I have described what appear to be the best embodiments of my invention, it is obvious, of course, that many modifications may be made which fall within the purview of the present invention. Broadly speaking my invention comprises a layer of conducting rubber derived from an applied liquid conducting rubber suspension containing sufficient conducting material in suspension to substantially lower the specific resistance, said layer being employed as an electric conductor. The specific resistance of this layer can be varied over wide limits and can be closely controlled by choice of the conducting material and by variations in the size and shape of the conducting particles. The conducting layers produced in this manner are of uniform thickness and can be applied with smooth boundaries free from ridges, thus avoiding any concentration of current. If this conducting rubber layer should have too high a resistance it is possible to increase its conductivity by the introduction of metal conductors, usually in the form of braided wire imbedded in the conducting rubber. These conducting rubber layers can be employed in all cables and other electric elements where an intimate union or bond is desired between rubber insulation and a conductor, said conductor being constructed either of metal or of conducting rubber.

Other modifications falling within the scope of the following claims will be immediately evident to those skilled in this art.

What I claim is:

1. An electric element comprising a layer of conducting rubber having smooth boundaries free from ridges and a uniform thickness ranging from about 0.1 to 0.5 mm. and being the indurated and vulcanized residue of an applied suspension of a conducting solid in a solution of rubber in a solvent.

2. An electrical element comprising a thin, vulcanized layer of conducting rubber having smooth boundaries free from ridges and a uniform thickness and being the indurated and vulcanized residue of a coating of a rubber solution containing a conducting solid in suspension therein in amount sufficient to substantially reduce the resistance of said rubber layer.

HENDRIK ADRIAAN MARIUS van HOFFEN.